US012590672B2

(12) United States Patent
Furfie

(10) Patent No.: US 12,590,672 B2
(45) Date of Patent: Mar. 31, 2026

(54) BRICK CAR WALL MOUNT WITH FIGURINE HOLDER

(71) Applicant: Matthew Furfie, Surprise, AZ (US)

(72) Inventor: Matthew Furfie, Surprise, AZ (US)

( * ) Notice: Subject to any disclaimer, the term of this patent is extended or adjusted under 35 U.S.C. 154(b) by 13 days.

(21) Appl. No.: 18/882,991

(22) Filed: Sep. 12, 2024

(65) Prior Publication Data

US 2026/0071718 A1     Mar. 12, 2026

(51) Int. Cl.
*F16M 11/00*          (2006.01)
*A63H 3/50*           (2006.01)
*F16M 13/02*          (2006.01)
*A63H 17/00*          (2006.01)

(52) U.S. Cl.
CPC .............. *F16M 13/02* (2013.01); *A63H 3/50* (2013.01); *A63H 17/002* (2013.01)

(58) Field of Classification Search
CPC ......... F16M 13/02; A63H 3/50; A63H 17/002
See application file for complete search history.

(56) References Cited

U.S. PATENT DOCUMENTS

| | | | | |
|---|---|---|---|---|
| 6,179,685 B1 * | 1/2001 | Toft | .......................... | A63H 3/52 |
| | | | | 446/268 |
| D1,048,862 S * | 10/2024 | Huang | .......................... | D21/486 |
| 2016/0327202 A1 * | 11/2016 | Hoeltge | .................. | A63H 3/50 |
| 2018/0332992 A1 * | 11/2018 | Chong | ............... | A47G 25/0607 |

* cited by examiner

*Primary Examiner* — Amy J. Sterling
(74) *Attorney, Agent, or Firm* — Bruce A. Lev

(57)                ABSTRACT

A brick car wall mount with figurine holder including a base plate attachable to a wall surface and having two spaced hook members extending therefrom adapted to retain two wheels of a brick car respectively thereon and hold the brick car in a vertical orientation adjacent to the wall surface. The brick car wall mount further includes a figurine holder extending from the base plate and adapted to releasably hold a figurine thereon for displaying the figurine alongside the brick car on the wall surface.

9 Claims, 3 Drawing Sheets

BRICK CAR WALL MOUNT WITH FIGURINE HOLDER

COPYRIGHT NOTICE

BACKGROUND OF THE INVENTION

1. Field of the Invention

This invention relates generally to wall mounts for brick cars, and more specifically to brick car wall mounts with a figurine holder extending therefrom.

2. Description of the Related Art

Prior art brick car wall mounts come in various shapes and sizes. However, there are no wall mounts that offer a convenient means for displaying both the brick car and an associated figurine adjacent to it on a wall surface. The present invention overcomes the disadvantages associated with the prior art by providing a brick car wall mount including a base plate attachable to a wall surface having two spaced hook members extending therefrom adapted to retain two wheels of a brick car respectively thereon and hold the brick car in a vertical orientation adjacent to the wall surface, and including a figurine holder extending from the base plate that is adapted to releasably hold a figurine thereon for displaying the figurine alongside the brick car on the wall surface.

BRIEF SUMMARY OF THE INVENTION

In view of the foregoing disadvantages inherent in the known types of brick car wall mounts or the like in the prior art, the present invention provides a brick car wall mount with figurine holder including a base plate attachable to a wall surface and having two spaced hook members extending therefrom adapted to retain two wheels of a brick car respectively thereon and hold the brick car in a vertical orientation adjacent to the wall surface. The brick car wall mount further includes a figurine holder extending from the base plate and adapted to releasably hold a figurine thereon for displaying the figurine alongside the brick car on the wall surface. As such, the general purpose of the present invention, which will be described subsequently in greater detail, is to provide a brick car wall mount with figurine holder with all the advantages of the prior art and none of the disadvantages.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The figures which accompany the written portion of this specification illustrate embodiments according to the teachings of the present invention.

FIG. 3b shows a bottom view of the brick figurine according to the preferred embodiment of the present invention of FIG. 3a.

Figure 1:
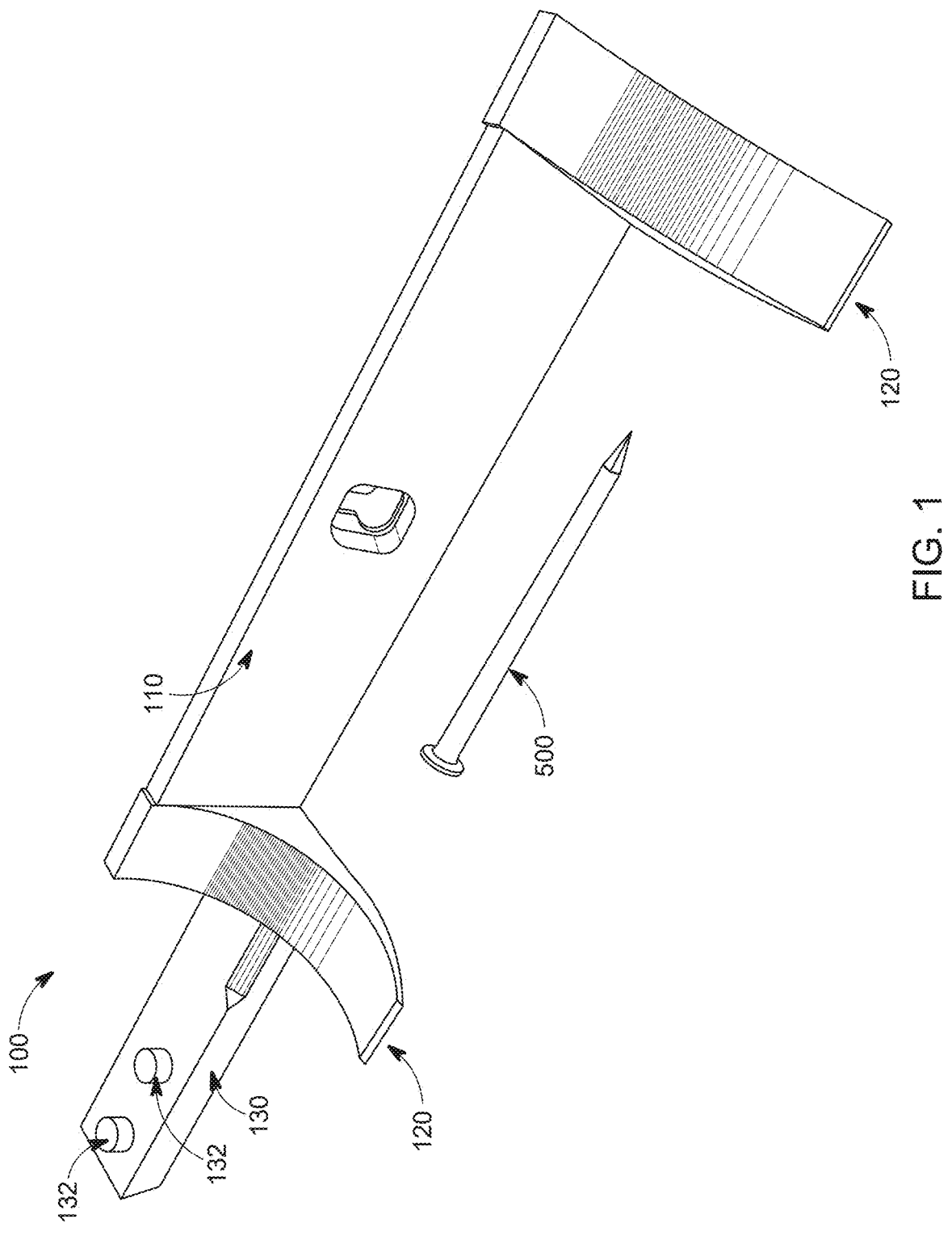
FIG. 1 shows a perspective view of the brick car wall mount with figurine holder according to the preferred embodiment of the present invention.

The various embodiments of the present invention will hereinafter be described in conjunction with the appended drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments and the accompanying drawings, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

Brick cars and figurines are formed from interconnected plastic bricks, commonly referred to as LEGOS (a trademarked brand). The instant car wall mount with a brick figurine holder 100 also includes a brick figurine holder 130 formed having a flat surface with a plurality of raised spaced cylindrical members 132 that is adapted to releasably connect with brick figurines 300 having a bottom surface including a plurality of spaced rectangular indentations 310, similar to the interconnected LEGO (a trademarked brand) plastic bricks.

Figure 2:
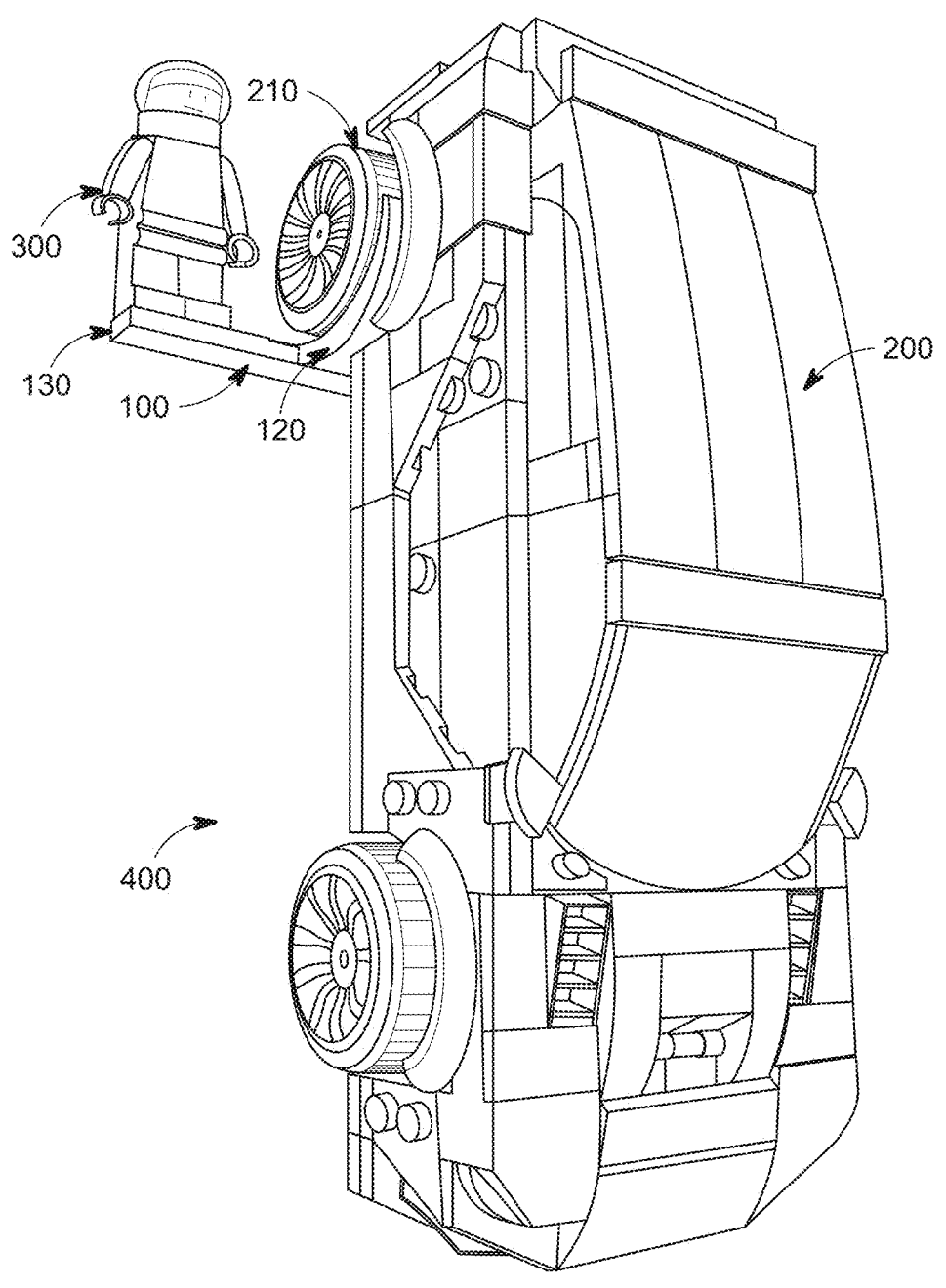
FIG. 2 shows a perspective view of the brick car wall mount with figurine holder attached to a wall surface, a brick car hung therefrom, and a figurine attached thereto according to the preferred embodiment of the present invention of FIG. 1.
Figure 3B:
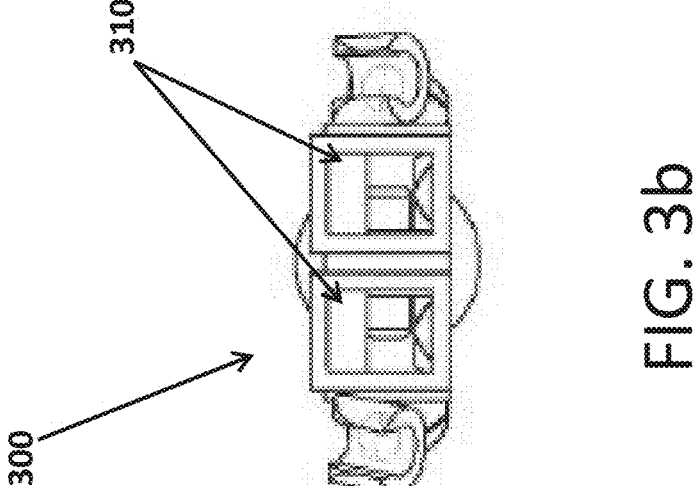
Figure 3A:
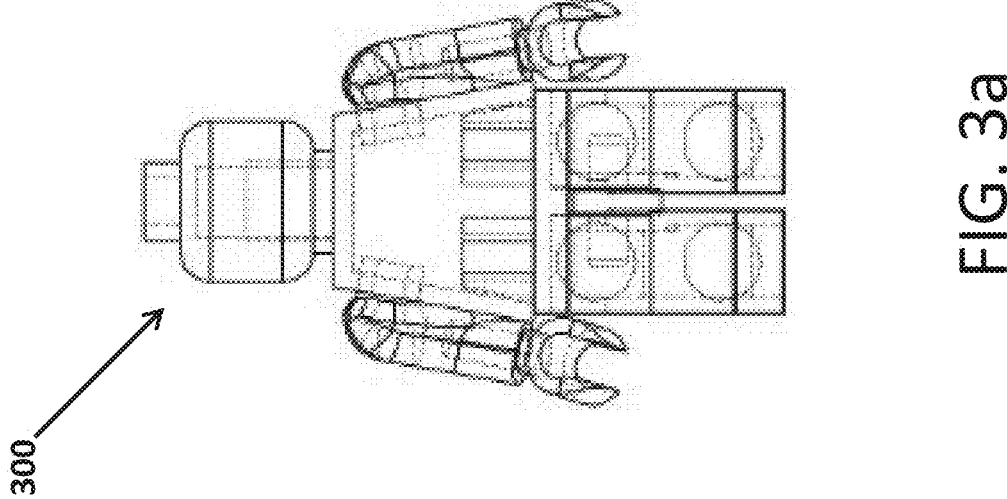
FIG. 3a shows a front view of a brick figurine according to the preferred embodiment of the present invention.

Turning now descriptively to FIGS. 1-3b, the preferred embodiment of the present invention is formed as a car wall mount with a brick figurine holder 100 for use with a brick car 200 having at least two spaced wheels 210, and a brick figurine 300 including a bottom surface including a plurality of spaced rectangular indentations 310. The brick car wall mount with figurine holder 100 comprises a base plate 110 adapted to be attached to a wall surface 400, two hooks 120 spaced from one another and attached to and extending from the base plate 110, and wherein the two hooks 120 are adapted to retain two wheels 210 of the brick car 200 respectively thereon and hold the brick car 200 in a vertical orientation adjacent to the wall surface 400, and a brick figurine holder 130 attached to and extending from the base plate 110, wherein the brick figurine holder 130 is formed having a flat surface with a plurality of raised spaced cylindrical members 132 adapted to releasably connect with the plurality of spaced rectangular indentations 310 of the brick figurine 300 to thereby releasably attach the brick figurine 300 thereto for displaying alongside the brick car 200 on the wall surface 400.

The base plate 110 includes a flat surface and the two hooks 120 extend from the base plate in perpendicular direction with respect to the flat surface, and wherein the brick figurine holder extends from the base plate in parallel direction with respect to the flat surface.

The base plate 110, the two hooks 120, and the brick figurine holder 130 maybe formed from a plastic material, or any other rigid material, including metal and wood. The car wall mount with a brick figurine holder 100 is attached to the wall surface 400 via fastener 500 adapted to connect the base plate 110 to the wall surface 400. The fastener 500 can be a nail, a screw, tape, glue, or any similar type of fastener.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention.

Although the invention has been explained in relation to its preferred embodiment, it is to be understood that many other possible modifications and variations can be made without departing from the spirit and scope of the invention.

What is claimed is:

1. A brick car wall mount with figurine holder, comprising:
   a base plate;
      wherein said base plate is adapted to be attached to a wall surface;
   two hooks;
      wherein said two hooks are spaced from one another and attached to and extending from said base plate; and
      wherein said two hooks are adapted to retain two wheels of a brick car respectively thereon and hold said brick car in a vertical orientation adjacent to said wall surface; and
   a figurine holder;
      wherein said figurine holder is attached to and extends from one of said two hooks at an orientation perpendicular to said one of said two hooks; and
      wherein said figurine holder is adapted to releasably hold a figurine thereon for displaying said figurine alongside said brick car on said wall surface.

2. The brick car wall mount with figurine holder of claim 1, wherein said base plate forms a flat surface; wherein said two hooks extend from said base plate in perpendicular direction with respect to said flat surface; and wherein said figurine holder extends from said base plate in parallel direction with respect to said flat surface.

3. The brick car wall mount with figurine holder of claim 1, wherein said figurine holder is formed having a flat surface with a plurality of raised spaced cylindrical members adapted to releasably attach a brick figurine thereto.

4. The brick car wall mount with figurine holder of claim 1, wherein said base plate, said two hooks, and said figurine holder are formed from a plastic material.

5. A combination of a brick car, a brick figurine, and a brick car wall mount with brick figurine holder, said combination comprising:
   a brick car including:
      at least two spaced wheels;
   a brick figurine including:
      a bottom surface including a plurality of spaced rectangular indentations; and
   a brick car wall mount with figurine holder, comprising:
      a base plate;
         wherein said base plate is adapted to be attached to a wall surface;
      two hooks;
         wherein said two hooks are spaced from one another and attached to and extending from said base plate; and
         wherein said two hooks are adapted to retain two wheels of said at least two wheels of said brick car respectively thereon and hold said brick car in a vertical orientation adjacent to said wall surface; and
      a brick figurine holder;
         wherein said brick figurine holder is attached to and extends from said base plate;
         wherein said brick figurine holder is formed having a flat surface with a plurality of raised spaced cylindrical members adapted to releasably connect with said plurality of spaced rectangular indentations of said brick figurine to thereby releasably attach said brick figurine thereto for displaying alongside said brick car on said wall surface.

6. The combination of claim 5, wherein said base plate forms a flat surface; wherein said two hooks extend from said base plate in perpendicular direction with respect to said flat surface; and wherein said brick figurine holder extends from said base plate in parallel direction with respect to said flat surface.

7. The combination of claim 5, wherein said base plate, said two hooks, and said brick figurine holder are formed from a plastic material.

8. The combination of claim 5, further comprising at least one fastener adapted to connect said base plate of said brick car wall mount with figurine holder to said wall.

9. The combination of claim 8, wherein said at least one fastener is chosen from a group of fasteners consisting of nails and screws.

\* \* \* \* \*